United States Patent [19]
Yano

[11] Patent Number: 5,895,131
[45] Date of Patent: Apr. 20, 1999

[54] RANGE FINDER SYSTEM FOR CAMERA

[75] Inventor: Takaaki Yano, Hokkaido, Japan

[73] Assignee: Asahi Kogaku Kogyo Kabushiki Kaisha, Tokyo, Japan

[21] Appl. No.: 09/009,253

[22] Filed: Jan. 20, 1998

[30] Foreign Application Priority Data

Jan. 18, 1997 [JP] Japan ................................. 9-019884

[51] Int. Cl.$^6$ ..................................................... G03B 13/16
[52] U.S. Cl. ..................................................... 396/141
[58] Field of Search ...................... 396/116, 117, 396/141, 142, 143, 139, 138, 148, 89, 150, 152; 356/3.13, 3.14, 8, 9, 17

[56] References Cited

U.S. PATENT DOCUMENTS

3,108,526 10/1963 Brackett ........................... 396/141
4,257,704 3/1981 Yokota et al. ........................ 356/8

*Primary Examiner*—W. B. Perkey
*Attorney, Agent, or Firm*—Greenblum & Bernstein P.L.C.

[57] ABSTRACT

Disclosed is a real-image object optical system 20, which is provided on the eyepiece optical system 28 side from the light path combining element 13, a first liquid crystal shutter 40 is provided for permitting/prohibiting incidence of light from the range finder window 31 to the object optical system, and a second liquid crystal shutter is provided in the vicinity of the image forming plane IM of the object optical system 20 for switching the light transmission range between the full range and a partial range, and by coupling and switching these elements, a superimposed full image and double image are caused to appear using a persistence of vision effect in the eye of the camera user.

17 Claims, 6 Drawing Sheets

RANGE FINDER SYSTEM FOR CAMERA

BACKGROUND OF THE INVENTION

The present invention relates to a range finder system utilizing superimposed two images.

A conventional range finder is provided with a first window and a second window which are separated by a predetermined base line length distance. Light entered through the first and second windows is combined by a half mirror and is directed to a common eyepiece optical system. The camera user observes superimposed two images of an object via the eyepiece optical system. Between the first window and the half mirror, there is provided a rotatable mirror which deflects incident light such that the degree of superimposition of the two images changes in the direction of the base line. The distance to the object is determined from the angle of rotation of the rotatable mirror when the two images of the object coincident.

In particular, in an interlocking type range finder, movement of the photographing lens is interlocked with rotation of the rotatable mirror such that the photographing lens focuses on the object when the two object images coincide.

Conventionally, two types of such a coincidence type range finder are known. In a first type, depending on the positional relationship between the objective lens and the half mirror, two objective lenses are provided respectively on two light paths an the object side of the half mirror. In the second type, a single virtual image type objective lens is provided on the eyepiece lens side of the half mirror.

In first type, especially when the objective lens forms a real image, the outline of each of the superimposed two images is clearly observable, and accordingly a clear field of view can be obtained. However, the first type of range finder system has the drawback of relatively high manufacturing costs, since it includes a large number of components and takes time to assemble.

In the second type, on the other hand, the number of component parts is greatly reduced, compared to the first type, and assembly thereof is easier, thus making it possible to reduce manufacturing costs. However, the second type of finder has a drawback in that, since the half mirror is positioned on the object side of the virtual image objective lens, the area of the half mirror will be relatively large, and if the objective lens is a zoom lens, the range in which the images are superimposed is formed and the unclearness of the image outline within this range will change with zooming of the lens, and there will be a significant drop in resolution especially when the zoom lens is located closer to a tele-photo side.

SUMMARY OF THE INVENTION

It is therefore an object of the invention to provide an improved range finder system with which the outline of the range where the images are superimposed can be observed clearly, without a rise in manufacturing and other types of costs, or a change in the size of the range where the images are superimposed even when the zooming is performed.

For the above object, according to the present invention, there is provided a range finder system for a camera, comprising: a first window and a second window which are separated by a predetermined distance in a direction of a base line; a light combining element for combining light entered from the first window and light entered from the second window; a real-image objective optical system to which the light combined by the light combining element is to be directed, the objective optical system forming a first image utilizing the light entered from the first window and a second image utilizing the light entered from the second window on an image plane of the objective optical system, the first and second images being superimposed on the image plane; and an eyepiece optical system through which an object image formed by the objective optical system is observed; a deflecting system which deflects the light incident from the second window such that a degree of offset of the second image with respect to the first image on the image plane is changed in a direction of the base line; a shuttering system which is capable of allowing and prohibiting incidence of light entered from the second window onto the objective optical system; a transmission range switching device arranged closely adjacent to the image plane for switching a range of a transmission area through which light is transmitted from the objective optical system to the eyepiece optical system, the transmission range switching device switching the range of the transmission area between a first range where light incident on the image plane is all transmitted and a second range where a part light incident on the image plane is transmitted; and a switching control system which controls the shuttering system and the transmission range switching system between two modes, one of the two modes being a partial image mode where incidence of light from the second window is permitted by controlling the shuttering system and the transmission area is limited to the second range by controlling the transmission range switching system, the other of the two modes being a full image mode where the incidence of light from the second window onto the objective optical system is prohibited by controlling the light path shuttering system and the transmission area is set to the first range by controlling the transmission range switching system, the switching being performed at a speed at which the alternately transmitted images can be perceived as a single image due to persistence of vision of the eye of a user of the camera.

Thus, according to the above-described range finder system, even if the magnification of the objective optical system is changed, the size of the region where the superimposed images are observed remains unchanged, and further relatively clear images are observable.

It is preferable that the shattering member is provided in the light path between the second window and the light combining element.

In a particular case, the shuttering member may include a liquid crystal shutter. In this case, for example, the liquid crystal shutter shields light when power is not supplied to the liquid crystal shutter, and transmits light when power is supplied to the liquid crystal shutter.

Alternatively, the shuttering member may have a rotating plate on which a plurality of light transmitting regions and opaque regions are formed at peripheral portion on the rotating plate, and the transmitting regions and opaque regions are located alternately in the light path when the rotating plate is rotated.

It is preferable that a plurality of light transmitting regions and opaque regions are aligned along the rotational direction of the rotating plate.

As for transmission range switching system, it may include a liquid crystal shutter which allows full transmission when its power supply is off and allows partial transmission when its power supply is on.

Optionally, the transmission range switching system may include a rotating plate on which full transmitting regions and partial transmitting regions are formed at peripheral positions about a center of rotation of the plate, and the full transmitting regions and partial transmitting regions are inserted alternately in the light path when the rotating plate is driven to rotate.

Further optionally, the range finder system may be provided with a distance information input system which obtains information related to a distance to the object, and a control system which controls the light path deflecting system, in accordance with the information related to the distance to the object, such that two images of the object which are formed utilizing light entered from the first window and the second window are superimposed.

Still optionally, the light path deflecting system may include a rotatable mirror and a driving system which drives the rotatable mirror to rotate.

Yet optionally, the light combining element is a transparent plate member provided with a half mirror region on a surface onto which light entered through the second window is incident. In this case, the half mirror region may be provided at a central portion of the surface of the transparent plate, at least a part of light incident from the second window and reflected by the half mirror is incident on a region where the superimposed two images are formed. Furthermore, light entered from the first window may pass through the transparent plate and directed to the objective optical system, and light entered from the second window may be reflected by the half mirror region and directed to the objective optical system.

Furthermore optionally, the superimposed two images respectively formed utilizing light entered from the first window and light entered from the second window are observable in the partial image mode.

Further optionally, the light from the second window enters the objective optical system only in the partial image mode.

According to another aspect of the invention, there is provided a range finder system for a camera, comprising: a first window and a second window which are separated by a predetermined distance in a direction of a base line; a real-image objective optical system, which forms a first image utilizing the light entered from the first window and a second image utilizing the light entered from the second window on an image plane of the objective optical system, at least a part of the first image and the second image being formed at a same region on the image plane, an optical axis of the objective optical system intersecting the first window; a rotatable mirror having a reflection surface without light transmitting regions; a deflecting system which deflects light incident from the second window toward the rotatable mirror; a mirror driver which drives the rotatable mirror to locate at a first position where the mirror allows light incident from the first window to enter the objective optical system and prevents light incident from the second window from entering the objective optical system, and a second position where the mirror prevents light incident from the first window from entering the objective optical system and allows light incident from the second window to enter the objective optical system; a transmission range switching device arranged closely adjacent to the image plane for switching a range of a transmission area through which light is transmitted from the objective optical system to the eyepiece optical system, the transmission range switching device switching the range of the transmission area between a first range where light incident on the image plane is all transmitted and a second range where a part light incident on the image plane is transmitted; and a switching control system which controls the mirror driver to locate the rotatable mirror alternately at the first position and the second position at a speed at which the first and second images observed through the eyepiece optical system is perceived as a single image, wherein the deflecting system is capable of changing a degree of offset of the second image, when the rotatable mirror is located at the second position, on the image plane with respect to the first image, when the rotatable mirror is located at the first position, on the image plane in a direction of said base line.

Thus, according to the above-described range finder system, superimposed image are observed due to persistence of vision effect of a human eye, and even if the magnification of the objective optical system is changed, the size of the area where the superimposed images are observed remains unchanged, and further relatively clear images are observable.

Optionally, the transmission range switching system may have a liquid crystal shutter which allows full transmission when its power supply is off and allows partial transmission when its power supply is on.

DETAILED DESCRIPTION OF THE PREFERRED EMBODIMENTS

Hereinafter, embodiment of the present invention will be described with reference to the accompanying drawings.

Figure 1:
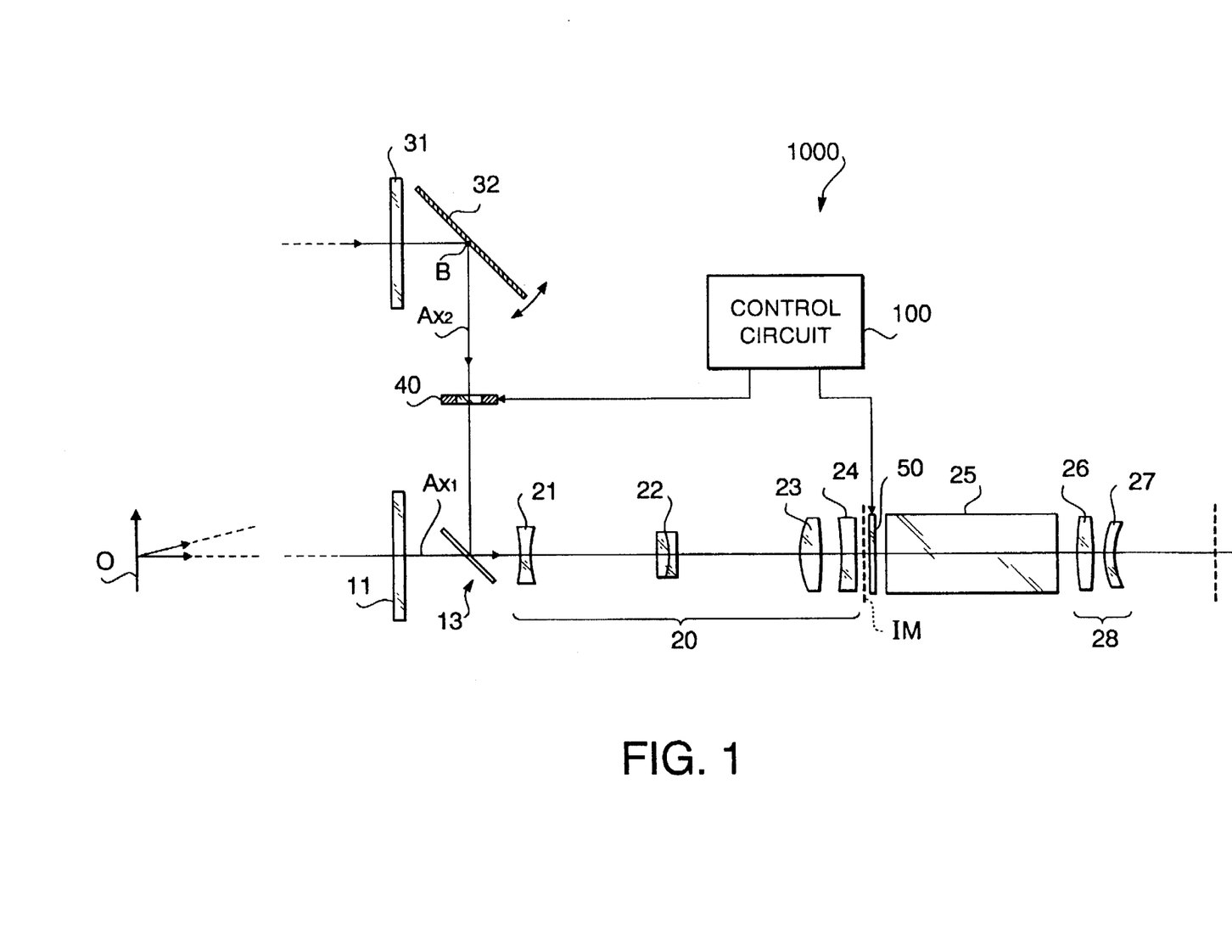
FIG. 1 is a diagram of an optical system and control system of a range finder system according to a first embodiment of the invention.

FIG. 1 is a diagram of an optical system and control system of a range finder system 1000 according to a first embodiment of the invention. The optical system comprises a first window 11 and a second window 31 which are separated by a predetermined base line length. Light from an object O incident via the first window 11, and light from the object O incident via the second window 31 and reflected by a rotatable mirror 32 are combined by a light combining element 13 and input to a real-image objective optical system 20 including four groups of lenses 21, 22, 23, 24 to form an inverted real image on an image plane IM. It should be noted that the objective optical system 20 is a zoom lens system. When the lens groups 21 and 22 moves, by a not shown lens driving mechanism, a magnification of the objective optical system 20 changes.

The light passed through the objective optical system 20 is reversed vertically and laterally by an erecting optical system 25 to form an erected image, which is introduced to the eye of the camera user via an eyepiece optical system 28 consisting of two groups of lenses 26 and 27. In the following description, an axis formed by linearly extending the optical axis of the eyepiece optical system 28 is defined as a first optical axis Ax1 of the first optical system, and an axis which is bent by the light combining element 13 and extends towards the rotatable mirror 32 is defined as the second optical axis Ax2 of the second optical system.

The light combining element 13 is a transparent parallel plate formed with a half mirror region in the central portion thereof, and it is positioned at 45 degrees with respect to the first optical axis Ax1, such that the first optical axis Ax1, and the second optical axis Ax2 intersect perpendicularly to each other. In the peripheral regions of the field of view which is observed by the user through the eyepiece lens, only light incident via the first window 11 enters the objective optical system 20. In the central region of the field of view, light incident via first window and light incident via the second window are combined and directed to the objective optical system 20. Therefore, if the liquid crystal shutters described below are not provided, the finder field of view observed by the camera user via the eyepiece optical system 28 would show a single image formed by light incident via the first window 11 in the peripheral region of the field of view, and a dual image (i.e., superimposed two images) formed by the light incident via both first and second windows in the central region of the field of view.

The rotatable mirror 32 is provided rotatably in the direction shown by the arrow in FIG. 1 about axis of rotation B which is perpendicular to the optical axes Ax1 and Ax2. By deflecting the light incident via the second window 21 by changing the rotation angle of the rotatable mirror 32, the degree of superimposition of two images observed within the field of view changes in the direction of the base length. In the first-embodiment, the rotatable mirror 32 is constructed such that rotation of the rotatable mirror 32 is interlocked with the focusing operation of the photographing lens, and when the photographing lens is focused with respect to the object, the superimposed two images of the object coincide.

A first liquid crystal shutter 40 is provided in the light path between the rotatable mirror 32 and the light path combining element 13 for allowing and prohibiting incidence of light from the second window 31 to the objective optical system 20.

Furthermore, a second liquid crystal shutter 50 is provided closely adjacent to the image plane IM for switching a size of light transmissive area between a size corresponding to the entire field of view and a partial field of view. Specifically, the first liquid crystal shutter 40 can be switched between a state where it allows all light to pass therethrough, and a state where it completely shields light. The second liquid crystal shutter 50 can be switched between a state where it allows all light to pass therethrough, and a state where it transmits only light incident on a central portion corresponding to an area where the two images are superimposed.

The drive logic for the liquid crystal shutters is such that, the first liquid crystal shutter 40 shields all light when the power supply is OFF and transmits all light when the power supply is ON, and the second liquid crystal shutter 50 transmits all light when the power supply is OFF and transmits only the light incident on a central portion thereof when the power supply is ON.

Figure 2A:
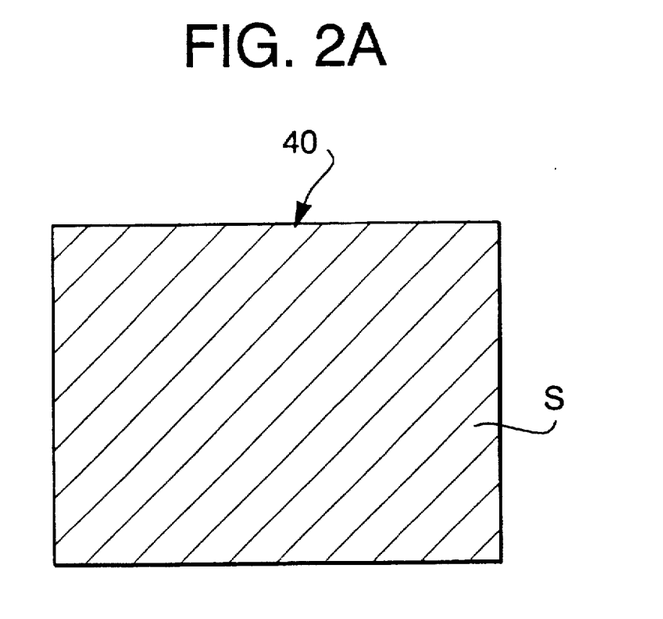
FIGS. 2A and 2B schematically show operation of a first and a second liquid crystal shutter employed in the range finder system shown in FIG. 1.
Figure 2B:
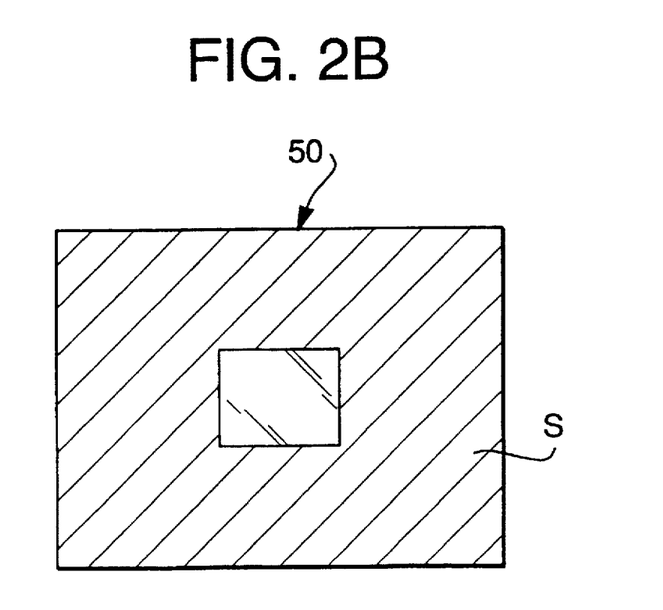

According to this logic, if a main power supply to the camera is turned OFF and no power is supplied to the liquid crystal shutters 40 and 50, the full field of view is observable utilizing the light incident via only the first window 11. For example, if a twisted nematic liquid crystal cell is used, the first liquid crystal shutter 40 has two polarizing plates placed on either side of a cell provided with an electrode S (diagonally hatched region) on the whole surface thereof, as shown in FIG. 2A, such that their axes of polarization are mutually parallel, and the second liquid crystal shutter 50 has two polarizing plates placed on either side of a cell provided with an electrode S on a portion thereof, excluding a central region where a double image is formed, as shown in FIG. 2B, such that their axes of polarization are mutually perpendicular.

The range finder system 1000 is further provided with a control circuit 100 which switches the ON and OFF states of the first and second liquid crystal shutters 40 and 50, respectively. When the main switch of the camera (not shown) is ON, the control circuit 100 repeatedly switches between a partial image mode and a full image mode as described below so that the superimposed image is observed in the finder field of view.

The partial image mode is a mode where the power supply to the first liquid crystal shutter 40 is ON and the power supply to the second liquid crystal shutter 50 is also ON. Thus, in the partial image mode, light entered from the second window 31 is allowed to enter the objective optical system 20, and at the same time, the transmission range of the second liquid crystal shutter 50 is limited to a central region thereof, thereby only superimposed images being observable in the central region of the field of view.

The full image mode is a mode where the power supply to the second liquid crystal shutter 50 is OFF and the power supply to the second liquid crystal shutter 50 is also OFF. Thus, light entered from the second window 31 is prohibited from entering the objective optical system 20, and at the same time, the transmission range of the second crystal liquid shutter 50 is set to the entire area of the field of view, thereby the full field of view being observed as a single image. It should be noted that the superimposed images are not viewed in the full image mode.

The control circuit 100 switches between the partial image mode and full image mode, at a speed whereby the display according to both modes is perceived as a single display due to a persistent view effect of the eye of the camera user. The switching cycle is set, for example, to a value of approximately 1/30 sec. through 1/24 sec., such that the full image and superimposed images are viewed naturally as a single image.

It should be noted that the superimposed image can be observed even when no liquid crystal shutters are provided in the above embodiment. In such a case, however, the size of the region in which the superimposed images are observed changes when the magnification of the objective optical system 20 is changed by zooming, and further the image outline becomes unclear.

According to the first embodiment, since the size of the region where the superimposed images are observable is defined by the transmission region in the central portion of the second liquid crystal shutter 50 which is provided closely adjacent to the image plane IM of the real-image objective optical system 20, even if the magnification of the object optical system is changed by zooming, the size of the double image area remains constant, and the image outline also remains clearly defined.

Figure 3:
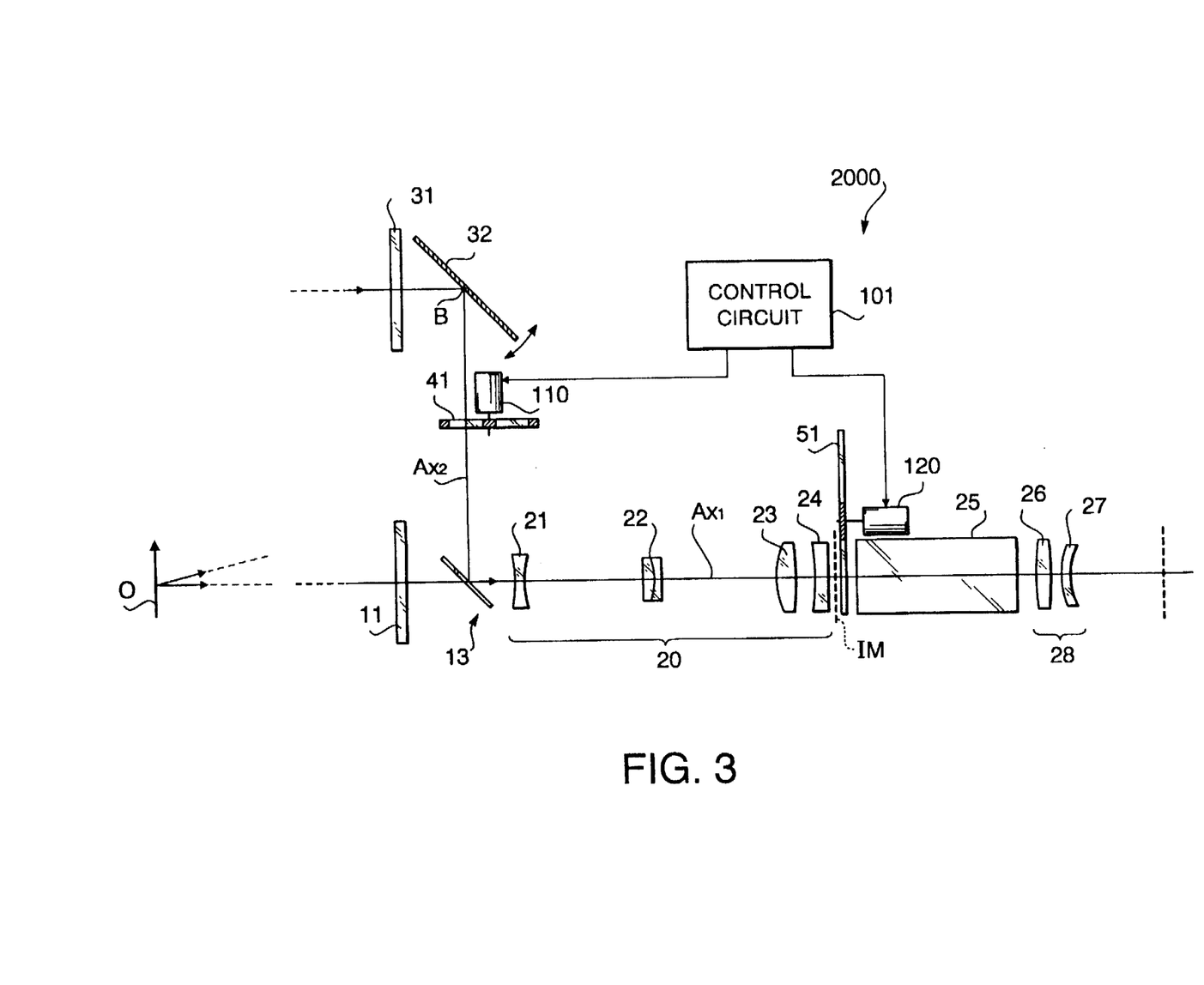
FIG. 3 is a diagram of an optical system and control system of a range finder system according to a second embodiment of the invention.

FIG. 3 is a diagram showing a range finder system 2000 according to a second embodiment of the invention. In the description below, the range finder system 2000 is described with particular reference to points that differ from the first embodiment. In the second embodiment, a first rotating disk 41 and a first rotating plate drive motor 110 are provided in place of the first liquid crystal shutter 40, and a second rotating disk 51 and second rotating plate drive motor 120 are provided in place of the second liquid crystal shutter 50. The control circuit 101 causes the superimposed images and the full image to be displayed alternately by synchronously controlling the rotating plate drive motors 110 and 120. The rest of the structure is similar to that in the first embodiment described in FIG. 1.

Figure 4A:
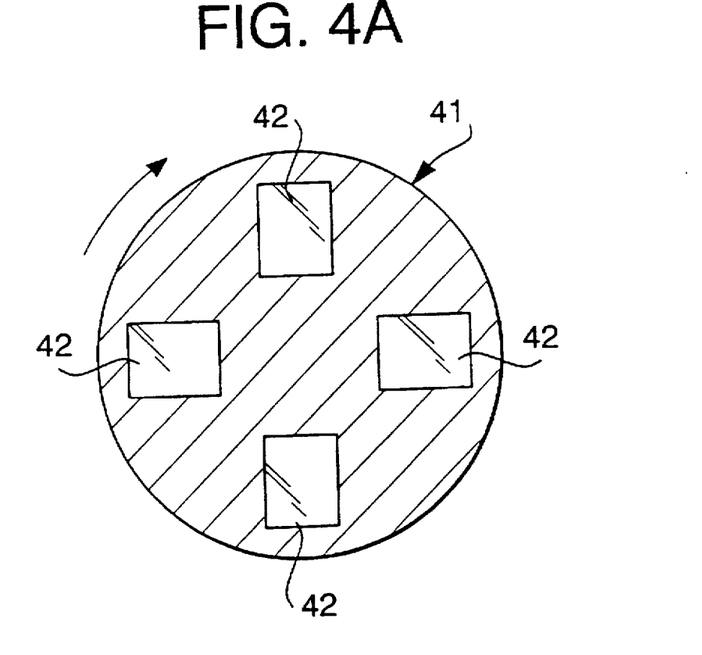
FIGS. 4A and 4B show structures of a first and a second rotating plates which can be employed in the range finder system shown in FIG. 3.

The first rotating disk 41 is an opaque rotating disk having four square-shaped transmission regions 42, 42, . . . which are formed at angular intervals of 90 degrees around the center of rotation of the disk 41. The area indicated by diagonal hatching is the opaque region of the disk 41. The control circuit 101 controls the first rotating disk drive motor 110 such that the first rotating disk 41 rotates intermittently (stepwise) in 45-degree steps. The first rotating disk 41 is constituted such that the transmission regions 42 and opaque region of the disk 41 are positioned alternately in the light path when it is driven to rotate by the first rotating disk drive motor 110. When a transmission region 42 intersects with the optical axis Ax2, only the light in the range of the transmission region 42 are incident on the half mirror 13, and when the opaque region intersects with the optical axis Ax2, the light is completely shielded. Therefore, by rotating the first rotating disk 41, the device switches periodically between fully transmitting and fully shielding the light introduced via the second window 31.

Figure 4B:
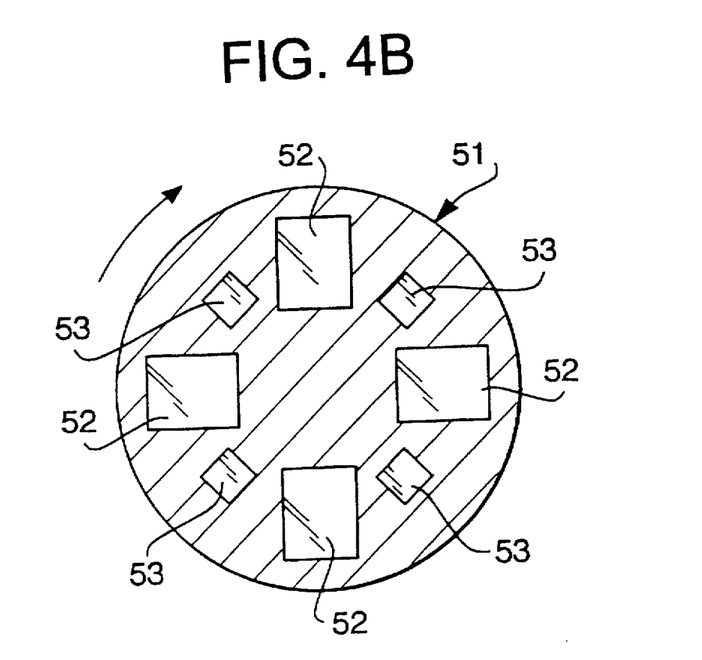

On the other hand, the second rotating disk 51 is an opaque rotating disk wherein full transmission regions 52, 52, . . . and partial transmission regions 53, 53, . . . , which are superimposed images forming regions, are formed alternately at angular intervals of 45 degrees about the center of rotation of the rotating disk 51. The diagonally hatched area indicates the opaque region of the disk 51. The control circuit 101 drives the second rotating disk drive motor 120 such that the second rotating disk 51 rotates intermittently in 45-degree steps. The second rotating disk 51 is constituted such that the full transmission regions 52, 52, . . . and the partial transmission regions 53, 52, . . . are periodically positioned alternately in the optical axis Ax1, when it is driven to rotate by the second rotating disk drive motor 120. When the full transmission regions 52, 52, . . . intersect with the optical axis Ax1, the light over the full field of view passes through the regions 52, 52, . . . , whereas when the partial transmission regions 53, 53, . . . intersect with the optical axis Ax1, only the light in a partial region is transmitted towards the eyepiece optical system. Therefore, by rotating the second rotating disk 51, the device switches periodically between full transmission and partial transmission of the light emerged from the objective optical system 20.

The control circuit 101 controls the disk drive motors 110 and 120 such that the a full image mode and a partial image mode are alternately selected. The full image mode is a mode where a full transmission region 52 of the second rotating disk 51 is positioned in the light path, and at the same time, the first rotating disk 41 is positioned to completely shield light. The partial image mode is a mode where a partial transmission region 53 of the second rotating disk 51 is positioned in the light path, and at the same time, a transmission region 42 of the first rotating disk 41 is positioned in the light path. It should be noted that the control circuit 101 controls both motors 110 and 120 such that these modes are switched at a speed whereby the alternate displays according to both modes are perceived as a single display due to persistence of vision effect of the eye of the camera user.

According to the second embodiment, the area where the superimposed images are observed is defined by the partial transmission regions 53 of the second rotating disk 51, which is provided closed adjacent to the image plane IM of the real-image objective optical system 20, and hence, even if the magnification of the objective optical system 20 is changed by zooming, the size of the superimposed image will remain constant and the image outline will remain clearly defined.

In the second embodiment, the transmission regions 42 on the first rotating disk 41 are provided in four positions and the full transmission regions 52 and partial transmission regions 53 on the second rotating disk 51 are provided in four positions. However, the numbers of regions are not limited to the above, and they may be provided in two, three or six positions, or the like. The angle of the rotational step is determined by 180/n (degrees), where n is the number of regions of each type.

It should be noted that, a combination of the liquid crystal shutter 40 of the first embodiment and the rotating disk 51 of the second embodiment, or a combination of the rotating disk 41 and the liquid crystal shutter 50 of the first embodiment can be employed in a range finder system.

Further, the rotating disk 41 or the liquid crystal shutter 40 may be placed at any position on the optical axis. Ax2 between the second window 31 and the light combining element 13, as far as it does not impede the movement of the rotatable mirror 32.

Figure 5:
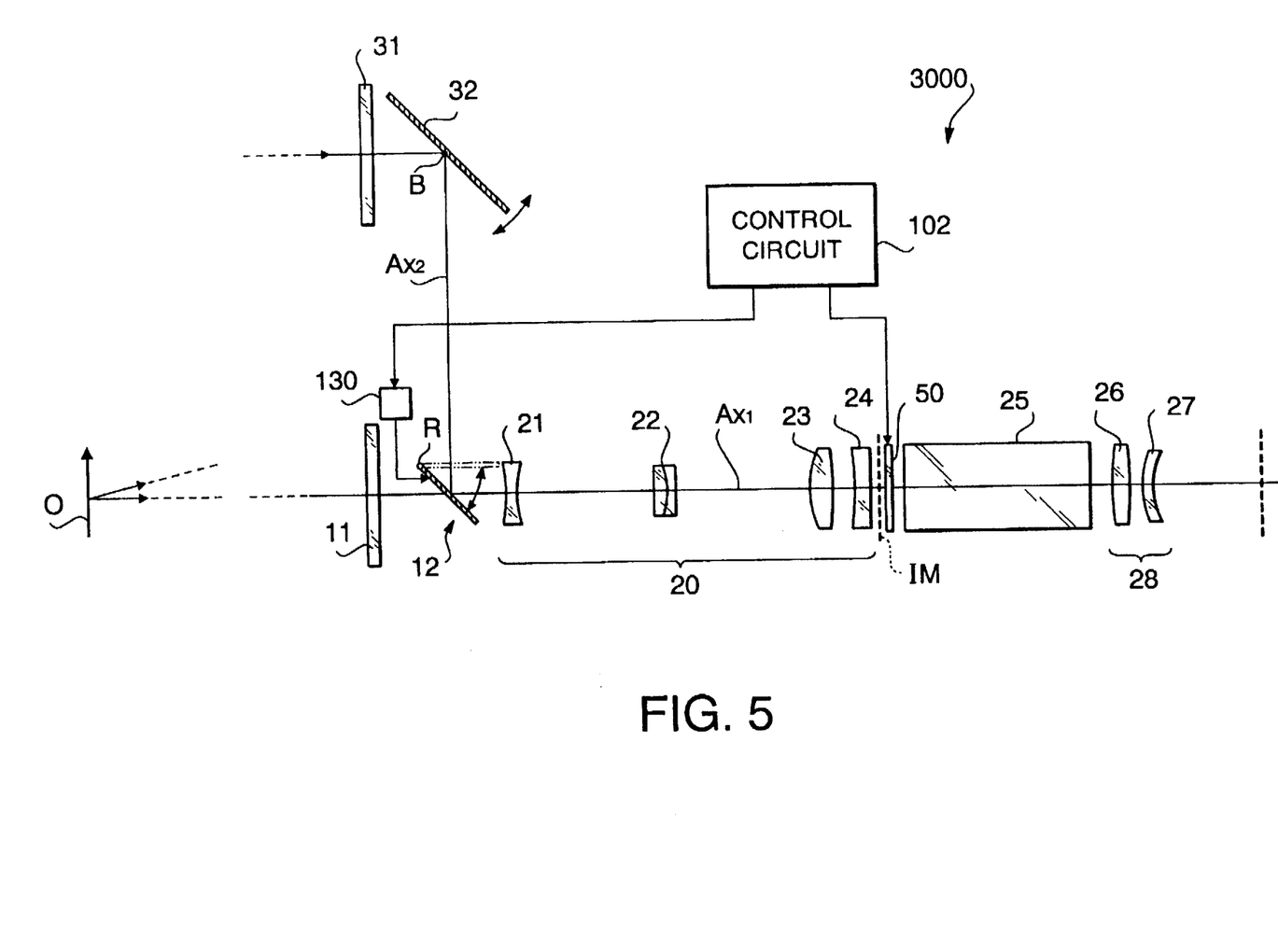
FIG. 5 is a diagram of an optical system and control system of a range finder system according to a third embodiment of the invention.

FIG. 5 is a diagram showing a range finder system 3000 according to a third embodiment of the invention. In the description below, the range finder system 3000 is described with particular reference to points that differ from the first embodiment.

The third embodiment is similar to the first embodiment shown in FIG. 1 except that the liquid crystal shutter 40 is omitted and a light combining element is constituted by a rotatable mirror 12 which allows or prevents transmission of light entered from the second window 31. The rest of the structure is similar to that in the embodiment illustrated in FIG. 1 and description thereof will be omitted.

The rotatable mirror 12 has a fully reflecting surface without any transmitting areas, and incident light from the first window 11 and incident light from the second window 31 are introduced selectively to the objective optical system 20 by switching the position of the rotatable mirror 12 by means of a mirror drive motor 130. Specifically, if the rotatable mirror 12 is positioned at a first position shown by the solid lines in the drawing, the incident light from the second window 31 is reflected by the rotatable mirror 12 and directed to the objective optical system 20. The incident light from the first window 11 is completely shielded.

On the other hand, if the rotatable mirror 12 is positioned at a second position shown by the broken line in the drawing, the incident light from the first window 11 is introduced to the object optical system 20, and in this condition, the incident light from the second window 31 is prevented from entering the objective optical system 20.

The control circuit 102 controls the mirror drive motor 130, and the second liquid crystal shutter 50. By switching between a partial image mode and a full image mode described below at a speed whereby the alternately display according to both modes is observed as a single display due to a persistence of vision effect of the eye of the camera user, superimposed images are formed within the field of view.

The partial image mode is a mode where the rotatable mirror 12 is positioned at the first position which is indicated by the solid lines, and simultaneously, the power supply to the second liquid crystal shutter 50 is ON. Thus, the light entered from the second window 31 is allowed to enter the objective optical system 20, the light entered from the first window 11 is completely shielded, and the transmission range of the second liquid crystal shutter 50 is restricted to the central portion thereof. In this mode, only a partial image formed by incident light only from the second window 31 and corresponding to the central transmissive portion of the second liquid crystal shutter 50 is observable in the field of view.

The full image mode is a mode where the rotatable mirror 12 is positioned at the second position indicated by the broken lines, and the power supply to the second liquid crystal shutter 50 is OFF. In this condition, light entered from the second window 31 does not directed to the objective optical system 20, all the light entered from the first window 11 enters the objective optical system 20, and the transmission range of the liquid crystal shutter 50 is set to the full field of view. In this mode, the full field of view is visible.

In the third embodiment, since incident light from the second window is allowed to enter the objective optical system 20 only in the partial image mode, two images are not formed simultaneously at any one instant. However, by switching between the partial image mode and the full image mode alternately and quickly, superimposed images can be observed due to the persistence of view effect. It should be noted that, in the first and second embodiments, the superimposed images are actually formed momentarily in the partial image mode.

Further, in the third embodiment, the range where the superimposed image is observed is set by the central transmission region of the second liquid crystal shutter 50, which is provided closely adjacent to the image plane IM of the objective optical system 20. Therefore, even if the magnification of the objective optical system is changed by zooming, the size of the range where the superimposed images are observed will remain constant and the image outline will remain clearly defined.

Figure 6:
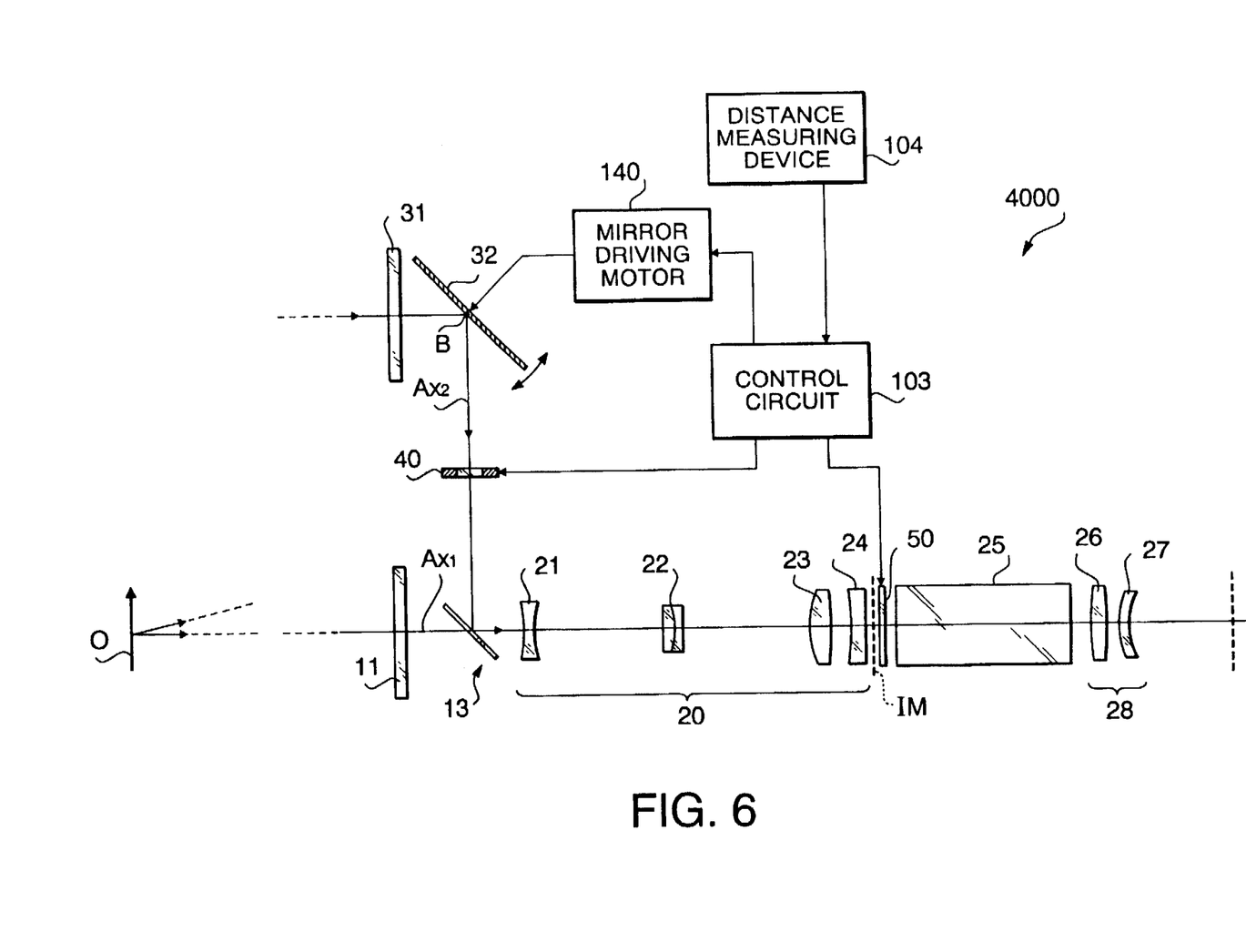
FIG. 6 is a diagram of an optical system and control system of a range finder system according to a fourth embodiment of the invention.

FIG. 6 is an illustrative diagram showing a range finder system 4000 according to a fourth embodiment of the present invention. The fourth embodiment is similar to the first embodiment shown in FIG. 1 except that a control circuit 103 is provided instead of the control circuit 100, that a distance measuring device 104 is provided, and that the rotatable mirror 32 is driven to rotate by a mirror drive motor 140 under control of the control circuit. The control circuit 103 controls a mirror drive motor 140 on the basis of the distance to an object which is measured by a distance measuring device 104, such that superimposed images of the object at the measured distance are formed by incident light from the first window 11 and light from the second window 31 coincide. It should be noted that, in the conventional range finder system, based on the rotation angle of the rotatable mirror, the object distance is determined. Such a conventional system is well known and, for example, is described in *The Manual or Photography*, Focal Press, London. In the present embodiment, using the same relationship between the object distance and the rotation angle of the rotatable mirror, the control circuit 103 drives the mirror drive motor 140 based on the measured distance.

In general, the object distance information output by the distance measuring device 104 is used by an autofocus device which automatically focuses the photographing lens on the object. In the fourth embodiment, however, the object distance information is also used for determining the angle of rotation of the rotatable mirror 32. With this structure, it is possible for the camera user to confirm, by looking through the finder, whether or not the photographing lens is correctly focused onto the object intended by the camera user. Specifically, if the superimposed images of the object whose distance is measured coincide fully in the superimposed image display region, and this object is the object intended by the camera user, then it can be determined that the device has been focused on the intended object, whilst if the superimposed images of the intended object are offset from each other and appear as a doubled image, then the operator can recognize that the object whose distance has been measured is different from the intended object. Accordingly, if the doubled image of the intended object is observed, the distance measurement should be repeated until the superimposed two images coincide.

This autofocus verification function by means of superimposed images described with reference to the fourth embodiment applies similarly to the second and third embodiments. That is, if the distance measuring device is employed in the second and third embodiments, and the rotatable mirror is controlled to rotate based on the measured object distance, the autofocus verification function can be achieved in the second and third embodiments in a similar manner.

As described above, with the range finder system according to the present invention, it is possible to produce a clearly outlined superimposed images without changing the size of the observed superimposed images, even when magnification of the objective optical system by zooming, and further, it is possible to prevent cost increases when compared to cases where a plurality of object optical systems are used.

The present disclosure relates to subject matter contained in Japanese Patent Application No. HEI 09-19884, filed on Jan. 18, 1997, which is expressly incorporated herein by reference in its entirety.

What is claimed is:

1. A range finder system for a camera, comprising:

a first window and a second window which are separated by a predetermined distance in a direction of a base line;

a light combining element for combining light entered from said first window and light entered from said second window;

a real-image objective optical system to which said light combined by said light combining element is to be directed, said objective optical system forming a first image utilising the light entered from said first window and a second image utilising the light entered from said second window on an image plane of said objective optical system, said first and second images being superimposed on said image plane; and an eyepiece optical system through which an object image formed by said objective optical system is observed;

a deflecting system which deflects the light incident from said second window such that a degree of offset of said second image with respect to said first image on said image plane is changed in a direction of said base line;

a shuttering system which is capable of allowing and prohibiting incidence of light entered from said second window onto said objective optical system;

a transmission range switching device arranged closely adjacent to said image plane for switching a range of a transmission area through which light is transmitted from said objective optical system to said eyepiece optical system, said transmission range switching device switching said range of said transmission area between a first range where light incident on said image plane is all transmitted and a second range where a part light incident on said image plane is transmitted; and a switching control system which controls said shuttering system and said transmission range switching system between two modes, one of said two modes being a partial image mode wherein incidence of light from said second window is permitted by controlling said shuttering system and said transmission area is limited to said second range by controlling said transmission range switching system, the other of said two modes being a full image mode wherein the incidence of light from said second window onto said objective optical system is prohibited by controlling said light path shuttering system and said transmission area is set to said first range by controlling said transmission range switching system, said switching being performed at a speed at which the alternately transmitted images can be perceived as a single image due to persistence of vision of the eye of a user of said camera.

2. The range finder system according to claim 1, wherein said shuttering member is provided in the light path between said second window and said light combining element.

3. The range finder system according to claim 2, wherein said shuttering member comprises a liquid crystal shutter.

4. The range finder system according to claim 3, when said liquid crystal shutter shields light when power is not supplied to said liquid crystal shutter, and transmits light when power is supplied to said liquid crystal shutter.

5. The range finder system according to claim 2, wherein said shuttering member comprises a rotating plate on which a plurality of light transmitting regions and opaque regions are formed at peripheral portion on said rotating plate, and said transmitting regions and opaque regions are located alternately in the light path when said rotating plate is rotated.

6. The range finder system according to claim 5, wherein said plurality of light transmitting regions and opaque regions are aligned along the rotational direction of said rotating plate.

7. The range finder system according to claim 1, wherein said transmission range switching system comprises a liquid crystal shutter which allows full transmission when its power supply is off and allows partial transmission when its power supply is on.

8. The range finder system according to claim 1, wherein said transmission range switching system comprises a rotating plate on which full transmitting regions and partial transmitting regions are formed at peripheral positions about a center of rotation of said plate, and wherein said full transmitting regions and partial transmitting regions are inserted alternately in the light path when said rotating plate is driven to rotate.

9. The range finder system according to claim 1, further comprising:

a distance information input system which obtains information related to a distance to said object; and a control system which controls said light path deflecting system, in accordance with said information related to said distance to said object, such that two images of said object which are formed utilizing light entered from said first window and said second window are superimposed.

10. The range finder system according to 1, wherein said light path deflecting system comprises:

a rotatable mirror; and a driving system which drives said rotatable mirror to rotate.

11. The range finder system according to claim 1, wherein said light combining element is a transparent plate member provided with a half mirror region on a surface onto which light entered through said second window is incident.

12. The range finder system according to claim 11, wherein said half mirror region is provided at a central portion of said surface of said transparent plate, at least a part of light entered through said second window and reflected by said half mirror region is incident on an area where said superimposed two images are formed.

13. The range finder system according to claim 11, wherein light entered from said first window passes through said transparent plate and directed to said objective optical system, and wherein light entered from said second window is reflected by said half mirror region and directed to said objective optical system.

14. The range finder system according to claim 1, wherein superimposed two images respectively formed utilizing light entered from said first window and light entered from said second window are observable in said partial image mode.

15. The range finder system according to claim 1, wherein the light from said second window enters said objective optical system only in said partial image mode.

16. A range finder system for a camera, comprising:

a first window and a second window which are separated by a predetermined distance in a direction of a base line;

a real-image objective optical system, which forms a first image utilising the light entered from said first window and a second image utilising the light entered from said second window on an image plane of said objective optical system, at least a part of said first image and said second image being formed at a same region on said image plane, an optical axis of said objective optical system intersecting said first window;

a rotatable mirror having a reflection surface without light transmitting regions;

a deflecting system which deflects light incident from said second window toward said rotatable mirror;

a mirror driver which drives said rotatable mirror to locate at a first position where said mirror allows light incident from said first window to enter said objective optical system and prevents light incident from said second window from entering said objective optical system, and a second position where said mirror prevents light incident from said first window from entering said objective optical system and allows light incident from said second window to enter said objective optical system;

a transmission range switching device arranged closely adjacent to said image plane for switching a range of a transmission area through which light is transmitted from said objective optical system to said eyepiece optical system, said transmission range switching device switching said range of said transmission area between a first range where light incident on said image plane is all transmitted and a second range where a part light incident on said image plane is transmitted; and a switching control system which controls said mirror driver to locate said rotatable mirror alternately at said first position and said second position at a speed at which said first and second images observed through said eyepiece optical system is perceived as a single image, wherein said deflecting system is capable of changing a degree of offset of said second image, when said rotatable mirror is located at said second position, on said image plane with respect to said first image, when said rotatable mirror is located at said first position, on said image plane in a direction of said base line.

17. The range finder system according to claim 16, wherein said transmission range switching system comprises a liquid crystal shutter which allows full transmission when its power supply is off and allows partial transmission when its power supply is on.

* * * * *